Figure 1:
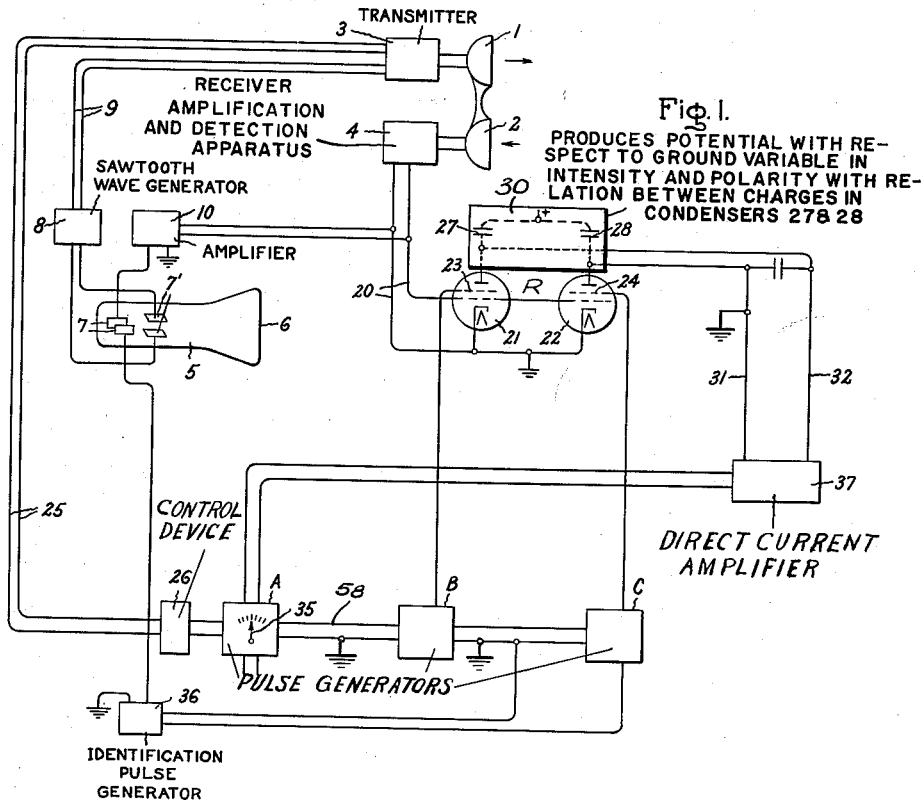

Sept. 10, 1963

W. C. HAHN 3,103,661

IMPULSE SYSTEMS

Filed June 27, 1941

3 Sheets-Sheet 1

Inventor:
William C. Hahn,
by Harry E. Dunham
His Attorney.

Sept. 10, 1963 W. C. HAHN 3,103,661
IMPULSE SYSTEMS
Filed June 27, 1941 3 Sheets-Sheet 2
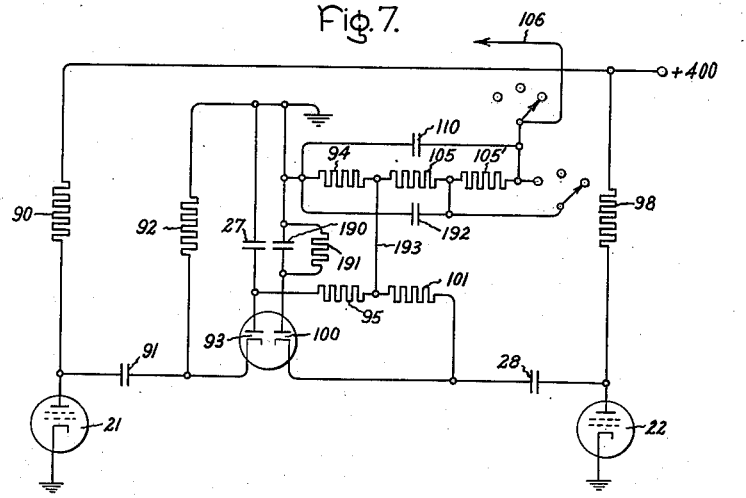
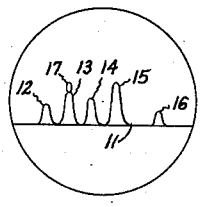
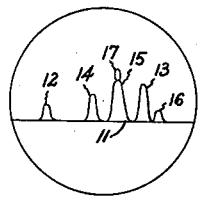
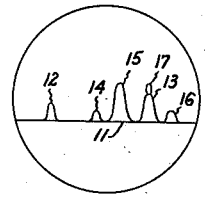
Inventor:
William C. Hahn,
by Harry E. Dunham
His Attorney.

Sept. 10, 1963 W. C. HAHN 3,103,661
IMPULSE SYSTEMS
Filed June 27, 1941 3 Sheets-Sheet 3

Inventor:
William C. Hahn,
by Harry E. Dunham
His Attorney.

3,103,661
IMPULSE SYSTEMS
William C. Hahn, Scotia, N.Y., assignor to General
Electric Company, a corporation of New York
Filed June 27, 1941, Ser. No. 400,080
82 Claims. (Cl. 343—7.3)

My invention relates to impulse systems in which impulses are transmitted to a distant point and after transmission of each impulse a corresponding impulse is received, as for example, due to reflection from the distant point or due to operation of apparatus located at the distant point. Such systems may be utilized to determine distance to such remote points, or to ascertain the identity of apparatus located at such point. In the following specification, I shall describe my invention with more particular reference to apparatus for measuring distance.

One of the objects of my invention is to improve reception of such impulses and to facilitate the use thereof in ascertaining knowledge concerning distant objects such as it is the purpose of such systems to ascertain.

Commonly such systems employ cathode ray apparatus to indicate reception of the impulses and to indicate the time interval between the time of transmission and reception of such impulses thereby to indicate the distance to the remote objects from which the impulses are received. Such cathode ray apparatus may employ a viewing screen over which a cathode ray is deflected in a predetermined path in synchronism with the transmitted pulses. This deflection may be initiated when each impulse is transmitted and may continue for a time as long as the time required for the impulse to travel to the most distant object, within the range of the equipment, and return. Means are provided whereby each returning impulse produces a deflection of the beam from its predetermined path on the screen, such deflections thus being visible and corresponding in position on the screen to the distance to the different distant reflecting surfaces which produce the received reflected impulses.

In the operation of such apparatus reflections are produced not only by a distant object, such as a remote aircraft, the distance of which is to be ascertained, and the movements of which are to be observed, but they are produced by many different surfaces upon which the outgoing impulses may happen to impinge. In addition, extraneous electric fields, noise, etc., may affect the equipment with the result that the indication on the cathode ray screen is the result of all of these various effects.

An object of my invention is to provide a system whereby impulses reflected from a particular distant surface may be selected from the aggregation of received impulses and utilized to the exclusion of other reflected impulses for the determination of the distance to the particular surface from which they are reflected.

Another object of my invention is to provide means whereby the indication on the screen produced by the selected impulses may be more readily identified on the screen, as by causing it to stand out more prominently on the screen than the other indications do. In this way the movements of the surface producing the selected series of impulses may be more readily observed by observation of the viewing screen.

Another object of my invention is to provide a method and means for reception in which the effect of undesired impulses, extraneous influences, etc., are reduced or eliminated.

Still another object of my invention is to provide an echo impulse system in which the indication of distance is continuous over a wide range of movement of the body the distance to which is measured and is secured with a minimum of interruption or manual manipulation of controls by the operator.

Still another object of my invention is to provide an echo system in which the receiving means is inoperative at all times except for brief intervals occurring just at the instants when desired echoes are received. A further object of my invention is to provide means whereby these intervals are automatically synchronized with the periods when reception occurs so that the receiver is in readiness for reception of the desired impulses but is inoperative at all other times. In this way the effect of undesired impulses and disturbances is largely avoided.

Still another object of my invention is to improve the accuracy with which distance may be determined by the echo impulse method.

Figure 2:
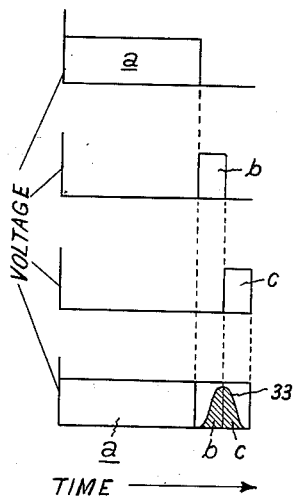
Figure 6:
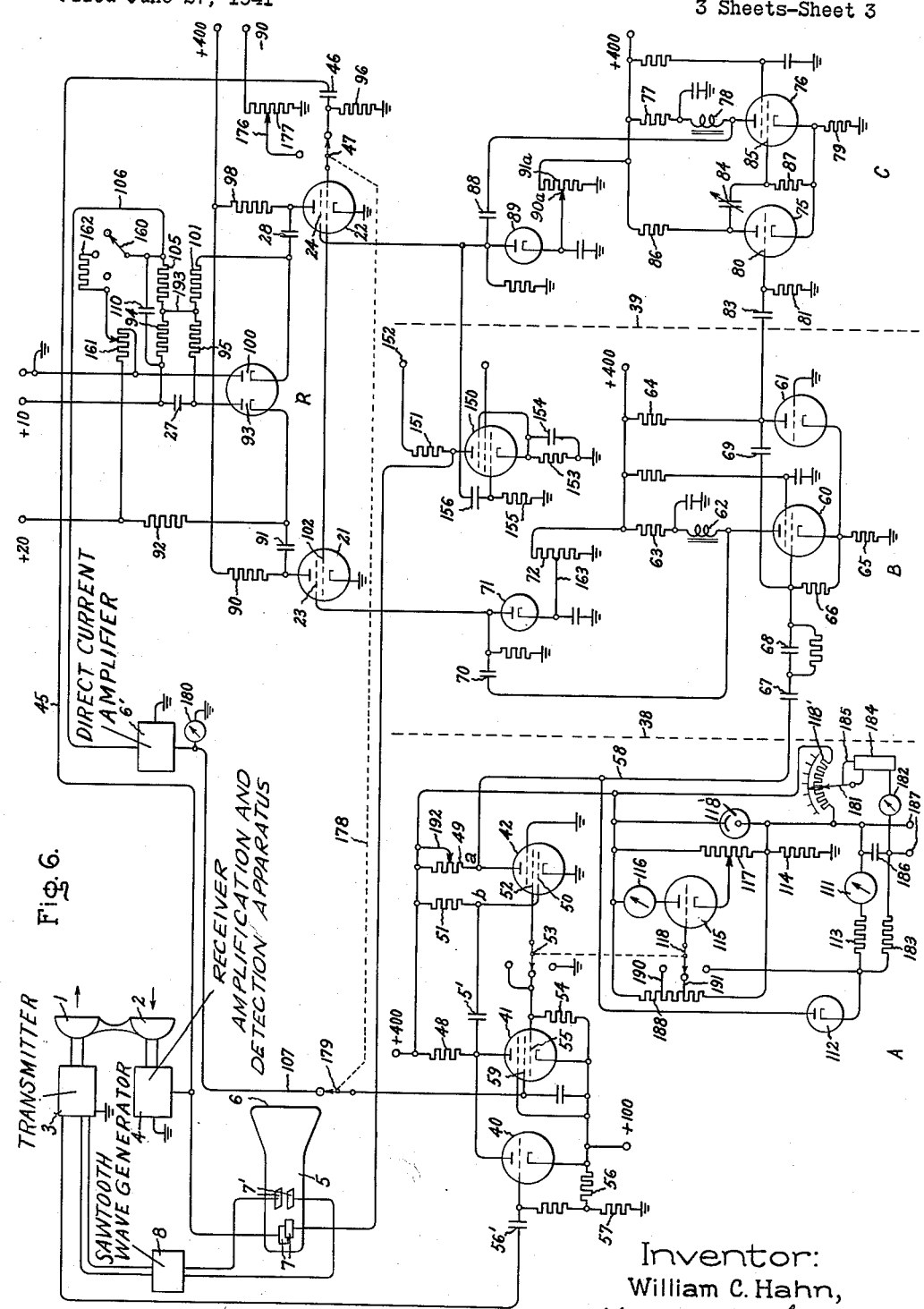

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which FIG. 1 represent an embodiment of my invention; FIG. 2 represents graphically certain characteristics of its operation; FIGS. 3, 4, and 5 represent certain indications which may be produced thereby; FIG. 6 represents in greater detail a circuit structure which may be employed in my invention, and FIG. 7 represents a modification of my invention.

Referring first to FIG. 1 of the drawing, I have represented therein at 1 a transmitter of short wave impulses and at 2 a receiving device arranged to intercept such impulses after reflection from a distant surface. The transmitter and receiving device may be of the highly directional short wave type adapted to radiate and receive rapid impulses of waves of short wave length. They are oriented in the same direction and arranged to have their orientation varied both in elevation and in azimuth in order that the distance may be scanned for reflecting objects such, for example, as aircraft, and whereby when such an aircraft is detected its movements may be observed and followed.

Circuits for the generation, amplification and transmission of the outgoing impulses may be comprised in the equipment represented by rectangle 3, which bears the legend "Transmitter," and similarly the circuits for the reception, detection, and amplification of received impulses are comprised within the rectangle 4, which bears the legend Receiver Amplification and Detection Apparatus.

At 5 I have conventionally represented a cathode ray oscillograph which may have a viewing screen 6 and which is connected both with the transmitter and receiving apparatus to produce upon the viewing screen an indication of echoes received from distant reflecting surfaces. This apparatus is of conventional construction employing means, not shown, for generating the cathode ray, which is transmitted between different pairs of deflecting plates such as those indicated at 7 and 7' before impinging upon the screen 6 to produce the desired indication. Electrodes 7 are arranged to produce a deflection of the beam in one plane and electrodes 7' are arranged to produce a deflection at right angles to the deflection produced by the electrodes 7. Electrodes 7' may be connected across the output of a saw-tooth wave generator 8 which supplies a saw-tooth wave between these electrodes 7'. This generator is controlled from the transmitter over conductors 9 so that each saw-tooth wave impulse is initiated just as an impulse is transmitted by the transmitter 1. This impulse may cause the cathode ray to deflect across the viewing screen in a straight line, for example, one traversal being made following the transmission of each impulse after which the ray is interrupted or "blanked out" and returned while "blanked out" to its initial position when it is again initiated. Apparatus for effecting such control of the cathode ray is conventional and well known in the art and need not be more particularly explained here.

The reflected impulse after being received in the receiving device 2, detected and amplified in the apparatus 4, may be supplied through an amplifier 10 between the electrodes 7, or between one of these electrodes and ground, thereby to produce a deflection of the cathode ray beam upon the screen 6 at right angles to the normal predetermined path of the beam, thereby to produce an indication at a point on the screen corresponding to the distant reflecting surface. In this way, indications may be produced upon the screen such as those indicated in FIGS. 3, 4, and 5 presently to be described.

Each of FIGS. 3, 4 and 5 represents the viewing screen of the cathode ray oscillograph having thereon a line 11 corresponding to the predetermined normal path, which the cathode ray traverses when no echo is received. These figures also illustrate echo indicating deflections 12, 13, 14, 15, and 16 of the cathode ray, each of which may correspond to a distant reflecting surface upon which the outgoing impulses impinge and which produce reflections received in the receiving equipment. Of course, each of these deflections, or indications, 12, 13, 14, 15, 16, are positioned upon the screen in accordance with the distance to the respective surface which produces it.

In the operation of such equipment the numerous such indications which may appear upon the screen as well as the effects of undesired extraneous influences may render the indication of the distance of a particular reflecting surface confusing and difficult.

In accordance with my invention, means are provided whereby the series of impulses producing a particular indication or deflection of the cathode ray, as for example the deflection 13, may be selected from the other impulses and utilized, through additional means to be described herein, to determine, with accuracy, the distance to the particular reflecting surface. At the same time, means are provided whereby the indication on the viewing screen produced by the particular series of impulses which is selected, is caused to stand out prominently among the other indications, thereby more readily to identify it on the screen and to observe its movements thereon.

This identification of the indication produced on the screen by the selected series of impulses is effected by so controlling the cathode ray beam as to cause the deflection produced by the selected series of impulses to appear brighter on the screen or to have an especially illuminated tip thereon, or otherwise as may be desired. I have found it convenient to produce a prominent tip thereon, as indicated at 17 on the deflection 13 in FIGS. 3, 4, and 5. Thereafter, as the indication 13 moves across the viewing screen from side to side in accordance with the movements of the distant object, which may be an aircraft, for example, it stands out by reason of its prominent tip and its movements are readily observable upon the screen among the other indications not so identified.

It may occur, however, that as the observed aircraft which produces the indication 13 moves, the indication 13 may traverse the screen from a position which it occupies in FIG. 3 to the position which it occupies in FIG. 4, thereby passing in its path, a more intense or extreme deflection such as that indicated at 15 and which may be produced by a monument, for example. It so happens, in the operation of the particular equipment to be described that when the observed indication 13 traverses a more extreme deflection such as that indicated at 15, its illuminated tip leaves it and mounts the more extreme indication, as shown in FIG. 4, where it remains. In accordance with my invention, means are provided whereby the identification may thereafter be restored to the selected indication 13 as indicated by FIG. 5.

The means whereby the impulses producing the desired indication are selected is shown in a general way in FIG. 1. It will be seen that the received impulses appearing in the output of the amplification and detection equipment 4 are supplied, not only through amplifier 10, between the electrodes 7, but they are also supplied through conductors 20 between the control electrode and cathode of each of a pair of receiving electron discharge devices 21 and 22. Each of these electron discharge devices is provided with an additional control grid 23 and 24, respectively, which in turn are controlled by pulse generators which I have designated on the drawing by reference characters B and C respectively. These pulse generators B and C are controlled by a pulse generator A which, in turn, is controlled from the transmitter 3 through conductors 25 and a control device 26.

In its operation upon transmission of any impulse by the transmitter 1, a pulse is initiated by apparatus A. This pulse is indicated by the rectangle $a$ in FIG. 2. In FIG. 2 each of the curves are plotted with voltage at a point on the output circuit of the respective pulse generators as ordinates and time as abscissa. During the transmission of this pulse $a$, equipment B and C are maintained in such condition that the grids 23 and 24 of discharge devices 21 and 22 respectively are maintained so negative with respect to their cathodes that these discharge devices are non-conducting and inoperative. Thus during the entire pulse $a$ following the transmission of each outgoing impulse, devices 21 and 22 are ineffective to receive any incoming wave.

After termination of the pulse $a$ by the equipment A of FIG. 1, equipment B is caused to produce a pulse $b$. This pulse causes the negative potential of the grid 23 of discharge device 21 to be sufficiently reduced to render that device conductive to an extent dependent upon the intensity of waves received over the conductors 20. This device then passes current and charges a condenser 27 to an extent dependent upon the intensity of the received impulses. Upon termination of pulse $b$ discharge device 21 is again rendered non-conductive and the charge remains upon condenser 27.

Upon termination of pulse $b$ equipment C is caused to produce a pulse $c$, which likewise reduces the negative potential on the grid 24 of discharge device 22 and renders that device conductive to an extent dependent upon the intensity of impulses received over conductors 20. Thus this device passes current and establishes a charge on condenser 28 of a value dependent upon the intensity of the received impulses. These condensers 27 and 28 thus integrate the intensity of the received impulses over the predetermined interval of duration of the respective pulses $b$ and $c$.

Equipment 30, which includes the condensers 27 and 28 and other elements not shown in FIG. 1, comprises apparatus connected to respond to the differential in potential on condensers 27 and 28 to produce a voltage with respect to ground between conductors 31 and 32 having a polarity and intensity dependent upon the relation between the integrated intensity of the energy received during pulse $b$ and that received during pulse $c$. This potential is supplied through a direct current amplifier 37 to the apparatus A whereby it is utilized to control the length of the pulse $a$.

In the lower portion of FIG. 2 I have shown the pulses $a$, $b$, and $c$ drawn in succession, on the same time scale, and within the rectangles representing pulses $b$ and $c$, I have shown a curve or shaded area 33 which may be taken to represent the time and intensity of a received reflected impulse as it appears upon the grids of discharge devices 21 and 22. As illustrated, the received impulse appears about equally during the two pulses $b$ and $c$. This indicates that the duration of pulse $a$ was just right to render discharge devices 21 and 22 operative at the correct time to receive the desired series of impulses.

Had the pulse 33 occurred slightly earlier so that the area under the curve 33 was greater during pulse $b$, than during pulse $c$, then the potential produced between the conductors 31 and 32 would be of such a value and polarity that, acting upon apparatus A, it would shorten the pulse *a*.

Had it occurred slightly later so that the area of the curve 33 during pulse *c* were greater than that during pulse *b* then the potential between conductors 31 and 32 would be of such value and polarity that, acting upon apparatus A it would lengthen the duration of pulse *a*. In this way the duration of pulse *a* is automatically lengthened and shortened in accordance with the quantum relationship, i.e., the relationship between integrated intensity of the energy received on discharge devices 21 and 22 during pulses *b* and *c*, thereby to cause the occurrence of these pulses *b* and *c* just at the time when the desired pulses are to be received, i.e., at the time when the echo pulses are received equally during the intervals of the two pulses *b* and *c*.

Thus discharge devices 21 and 22 may each be likened to shutters of a camera, the shutter 21 being open for the interval of impulse *b* and the shutter 22 being open during the interval of impulse *c*. The shutters are opened for predetermined intervals occurring at a time controlled by the duration of pulse *a* after transmission of each outgoing impulse. The duration of pulse *a* is controlled in turn, by the relation between the integrated energy, or the amount of light, in the camera analogy, which enters through the two shutters during the periods when they are open.

Of course, the length of the pulse *a* is a criterion for the determination of distance to the surface from which the selected impulses are received and this indication may be produced by any suitable equipment associated with apparatus A, and the indication of which may be produced by an index member such as I have conventionally represented at 35 cooperating with a suitably calibrated scale.

To identify upon the viewing screen 6 of the cathode ray oscillograph the particular indication produced thereon by the series of impulses which are selected by the discharge devices 21 and 22 apparatus represented by the rectangle 36 is provided. This apparatus may be controlled either by the equipment B, or the equipment C, to produce between the electrodes 7 of the cathode ray oscillograph a pulse during the intervals of one or the other of pulses *b* or *c*. Thus the pulse supplied by the equipment 36 may aid the pulse supplied to the electrodes 7 by the equipments 4 and 10 and thus cause a projection, or bright spot, to appear as indicated at 17 in FIGS. 3, 4 and 5. The tip of the deflection, or indication, which is produced by the selected series of impulses of that indication thus becomes prominent and stands out upon the screen of the cathode ray oscillograph. On the other hand the identification pulse may oppose the impulses supplied between electrodes 7 by equipment 4 and 10 and thus produce a depression at the tip of the indication to be identified. I have preferred the first of these means of identification.

Referring to FIG. 6, I have indicated therein in greater detail, equipment comprising a particular circuit which may be employed in my invention. It will be understood, however, many different circuit structures and instrumentalities may be employed in carrying out my invention.

The receiving equipment R comprising discharge devices 21 and 22 of FIG. 1 is represented at the upper right hand portion of FIG. 6 and is designated generally by the character R. Condensers corresponding to condensers 27 and 28 of FIG. 1, likewise appear on FIG. 6 and are designated by the same reference numerals.

At the lower portion of FIG. 6 I have indicated two vertical dotted lines 38 and 39. The equipment at the left of the dotted line 38 includes the pulse generator A of FIG. 1. The equipment represented between the dotted lines 38 and 39 includes the pulse generator B of FIG. 1 and the equipment to the right of the dotted line 39 represents the pulse generator C of FIG. 1.

The impulses received in the equipment 4 are supplied between the upper plate 7 of the cathode ray oscillograph and ground. They are also supplied through conductor 45, condenser 46 and switch 47 in its lower position, to the control grids of discharge devices 21 and 22. These discharge devices are normally non-conducting by reason of potentials supplied to their screen grids 23 and 24.

*Equipment A*

Referring first to the equipment A of FIG. 6 it will be observed that the discharge devices 40, 41, and 42 all have anodes which are connected through resistances to a positive terminal of a source of operating potential, which may, for example, be of 400 volts. This terminal is indicated by the reference character +400 on the drawing. The anodes of discharge devices 40 and 41 are connected thereto through resistance 48, and the anode of discharge device 42 is connected thereto through variable resistance 49. The control electrode 50 of discharge device 42 is likewise connected to the 400 volt source through resistance 51 and its screen grid 52 may be connected through a switch 53 either in its middle, or upper position, and a resistance 54, to a 100 volt terminal of the source indicated by the reference character +100.

It will be understood that on the drawing, FIG. 6, the different operating potentials may be derived from a common source or from different sources preferably having a common ground connection and that the terminals indicated on the drawing may be taken to represent different taps on such common source or the terminals of different sources having the voltages corresponding to the reference character applied to the respective terminal. These voltages may, of course, be varied as desired.

The discharge device 42 is normally conducting and passes current both through its anode and resistance 49 and also through its screen grid and resistance 54. Its anode is thus at a low positive potential by reason of the drop of potential on resistance 49. The drop in potential on resistance 54 causes the control grid 55 of discharge device 41 to be sufficiently negative with respect to its cathode to render that device non-conducting.

The cathode of the device 40 is connected to the 100 volt terminal on the source of potential and between this 100 volt terminal and ground are connected resistances 56 and 57. The control electrode of this device is connected between these two resistances 56 and 57 and thus is negative with respect to the cathode whereby this device is likewise normally non-conducting.

Thus in the apparatus A we have discharge devices 40 and 41 normally non-conducting and discharge device 42 normally conducting.

When an impulse is transmitted by transmitter 1, a short impulse is also supplied through condenser 56' to the grid of discharge device 40 of such polarity as to render that device momentarily conducting. It then passes current between its anode and cathode and through resistance 48. This causes the potential of the anodes of discharge devices 40 and 41 to be reduced, thus, through the charge on condenser 5', driving the control electrode 50 of discharge device 42 negative with respect to the cathode of device 42. Device 42 then becomes non-conducting and its anode, and the output conductor 58 leading to apparatus B, rises to the potential of the 400 volt source. This is the beginning of the pulse *a* of FIG. 2.

When discharge device 42 becomes non-conducting its screen grid current is interrupted and thus the voltage drop on resistance 54 disappears and discharge device 41 becomes conducting. This maintains both the current in resistance 48 and also the negative potential upon the control electrode of discharge device 42.

This condition of discharge devices 40, 41 and 42 is maintained throughout the duration of pulse *a* which is supplied over conductor 58 to apparatus B.

After a time interval determined by the charge on condenser 5', the values of resistances 48 and 51, and the potential to which the anode of device 41 drops when this device becomes conductive, this condenser 5′ discharges through the resistances 48 and 51 to such a point that the negative voltage on grid 50 is reduced to the cut off voltage of that device and discharge device 42 again becomes conductive and passes both screen grid current and anode current. The screen grid current flowing through resistance 54 renders discharge device 41 non-conducting and its anode voltage immediately rises by reason of interruption of current in resistance 48. Device 40 previously became non-conducting by reason of termination of the pulse on its control electrode which rendered it conducting. The grid 50 of discharge device 42 now becomes positive and maintains this discharge device in its conducting condition. This is the termination of pulse $a$ of FIG. 2. Conductor 58 is now again at a positive potential less than 400 volts by an amount equal to the drop in potential on resistance 49.

It will be observed that the duration of pulse $a$ is dependent upon the potential of the anode of device 41 when that device is conducting. If this potential be low, condenser 5′ must discharge to a greater extent before device 42 becomes conducting than would be the case were this anode potential higher. Thus the duration of pulse $a$ is directly dependent upon current flowing through resistance 48 when discharge device 41 is conducting. The extent to which this device is conducting is, of course, dependent upon the potential upon its screen grid 59 which in turn is controlled through amplifier 6′ from the output of the receiving discharge devices 21 and 22 and hence, as will presently be shown, it is dependent upon the time of arrival of the received reflected pulses. If screen grid 59 be highly positive such that discharge device 41 passes a large current, then the anode of device 41 drops to a low value and the charge on condenser 5′ must more completely leak off before device 42 becomes conducting. Thus a high positive voltage on grid 59 increases the time interval of pulse $a$. If grid 59 be less positive, device 41 passes less current and its anode does not drop to so low a value and condenser 5′ requires a smaller interval to discharge to an extent required to render device 42 conductive and thus a shorter pulse $a$ is produced.

Equipment B

Apparatus B comprises a pair of electron discharge devices 60—61. The anode of discharge device 60 is connected through an inductance coil 62 and a resistance 63 to the positive terminal of the 400 volt source marked +400. The anode of discharge device 61 is connected through a resistance 64 to the positive terminal of the 400 volt source. The cathodes of these devices are connected together and to ground through a resistance 65. The control electrode of discharge device 60 is connected through resistance 66 to the cathode so that the discharge device 60 is normally conductive, passing current through resistance 63, inductance 62 and resistance 65. The control electrode of discharge device 61 is connected to the negative terminal of resistance 65 and to ground and thus this device is normally non-conducting. This is the normal stand-by condition of the apparatus.

At the beginning of pulse $a$ when discharge device 42 first becomes non-conducting and its anode potential rises, due to the conneciton of that anode through conductor 58 and condensers 67 and 68 with the grid of discharge device 60, the grid of the latter device also becomes more positive with respect to the cathode. Since this device is already conducting, however, this has no effect. A charge, however, is built up in condenser 67 from the 400 volt source. On termination of pulse $a$ when discharge device 42 again becomes conducting, its anode drops in potential, thus, by reason of the charge on condenser 67, driving the control electrode of discharge device 60 far negative with respect to its cathode. This interrupts the current in discharge device 60 and in the resistance 65, which in turn causes discharge device 61 to become conducting. The anode of discharge device 61 then drops in potential and by reason of the charge on condenser 69, which is connected between its anode and the control electrode of the device 60, causes the latter electrode to be maintained at a negative potential and that device to be maintained non-conductive. This condition continues throughout the duration of pulse $b$.

After a predetermined time the charge on condenser 69 leaks off sufficiently through resistances 64, 66, 65 to such a point that the grid potential of discharge device 60 again attains the cut-off potential of that device permitting that device to become conducting and to pass current through resistance 65. This in turn causes the cathode of discharge device 61 to become positive with respect to its control grid and this discharge device to become non-conducting. Its anode potential then rises, acting through condenser 69 to render the control grid of discharge device 60 more positive and thus the original condition is restored. This is the termination of the pulse $b$.

At the beginning of pulse $b$, when discharge device 60 becomes non-conducting the interruption of current in the high reactance 62 causes a voltage surge, or pulse, to be supplied through the circuit extending from the positive terminal of the 400 volt source through resistance 63, inductance 62, condenser 70, diode 71 and lower portion of resistance 72, which is connected across the 400 volt source. This pulse is of such polarity that it causes the discharge device 21 to be conductive. The inductance 62 is of such a value that this pulse continues throughout the duration of pulse $b$ but is interrupted when device 60 again becomes conducting. During this interval, current flows in the discharge device 21 to an extent dependent upon the potential supplied to the control grid thereof from the receiver through conductor 47 and condenser 46. When discharge devices 60 and 61 have completed their cycle of operations, device 60 again becomes conducting and the pulse is terminated. The grid 23 of device 21 then again becomes negative with respect to its cathode and that device becomes non-conducting.

Equipment C

Apparatus C is similar to apparatus B comprising discharge devices 75 and 76, the latter being conducting and normally passing current through resistance 77, inductance 78 and resistance 79. The cathode of discharge device 75 is connected to the positive terminal of resistance 79 and the control electrode 80 thereof is connected through resistance 81 to ground and to the negative terminal of resistance 79. Thus the potential on resistance 79 renders the electrode 80 negative with respect to the cathode of device 75 and that device is normally non-conductive.

At the beginning of pulse $b$ when device 61 becomes conducting and the potential of its anode drops, the grid 80 is driven more strongly negative with respect to the cathode of device 75 but since that device is already non-conducting, nothing further happens. The condenser 83, however, discharges to some extent during pulse $b$. Upon termination of pulse $b$ when device 61 again becomes non-conductive and its anode potential rises, the control electrode 80 of device 75 is rendered positive with respect to the cathode and this device becomes conducting. Its anode potential drops; and by reason of the charge on condenser 84 it drives the control electrode 85 of device 76 negative with respect to its cathode and causes that device to become non-conducting, thus interrupting the current in inductance 78 and resistance 79. After a predetermined time the charge on condenser 84 leaks off through resistances 86, 87 and 79 and the control electrode 85 of discharge device 76 again approaches the potential of the cathode and the device becomes conducting and passes current through inductance 78 and resistance 79. The potential on resistance 79 then drives the grid 80 of device 75 negative with respect to its cathode and causes that device to become non-conducting. This restores the original condition. This is the termination of pulse c.

When current in discharge device 76 is first interrupted, inductance 78 produces a pulse of current which flows from the positive terminal of the 400 volt source through resistance 77, inductance 78, condenser 88, diode 89, variable tap 90a on potentiometer 91a and the lower portion of potentiometer 91a to ground and thence back to the negative terminal of the 400 volt source. This pulse is of such polarity that it drives the grid 24 of discharge device 22 positive with respect to the cathode thereof and renders that device conducting. The inductance 78 is of such a value that this pulse continues throughout the duration of pulse c but is interrupted when device 76 again becomes conducting.

Equipment R

Considering now the receiving equipment R comprising discharge devices 21 and 22, these devices are rendered conducting by their grids 23 and 24, each for a predetermined interval determined respectively by the condensers 69 and 84, the device 21 being conductive for the interval of pulse b and the device 22 for the interval of pulse c. The anode circuit of device 21 extends from the positive terminal of the 400 volt source through a resistance 90 and anode and cathode of discharge device 21 back to the negative terminal of the 400 volt source. The anode of the discharge device 21 is connected through a large condenser 91 and a resistance 92 to a 20 volt terminal on the potential source, this terminal being marked +20 on the drawing. Thus when discharge device 21 is non-conducting this condenser 91 is charged to 380 volts. The anode of discharge device 21 is also connected through condenser 91, cathode and anode of a diode 93 and condenser 27 to a ten volt terminal on the voltage source. This terminal bears the legend +10 on the drawing. Across condenser 27 are connected two resistances 94 and 95 through a conductor 193 so that any charge on condenser 27 may leak off through the path 94, 193, 95. Since the cathode of device 93 is connected through resistance 92 to a point on the source more positive than the point to which the anode is connected through resistances 95 and 94, diode 93 is normally non-conducting and the condenser 27 is discharged.

The anode of device 22 is connected to the positive terminal of the 400 volt source through a resistance 98 and it is also connected through a condenser 28 and the cathode and anode of a diode 100 to ground and the zero voltage terminal of the 400 volt source. The cathode of diode 100 is connected through resistances 101 and 94 to the ten volt terminal on the source and accordingly is at more positive potential than the anode of device 100, with the result that this device is normally non-conducting. Since the cathode of diode 100 is ten volts positive with respect to ground and the anode of discharge device 22 is at 400 volts, it will be seen that the condenser 28 is charged to 390 volts. This condition may be assumed at the end of pulse a.

During pulse b, the grid 23 of device 21 becomes positive causing this device to pass current. The current that it passes has an intensity controlled by the potential on its control grid 102 and thus the current flowing between the anode and cathode of this device varies with the intensity of the pulse received from the remote point. Its anode drops in potential causing the cathode of diode 93 to become negative with respect to the anode thereby causing this diode to pass current and charge condenser 27. Since the anode potential of device 21 may drop by a very large amount and since condenser 91 is so large that its charge does not change appreciably during pulse b, condenser 27 may be charged to a very high potential as, for example, 200 volts or more. On termination of pulse b, tube 21 again becomes non-conducting, its anode potential rises, thus restoring the cathode of diode 93 to a voltage positive with respect to the anode of that diode, thereby rendering it non-conducting, leaving condenser 27 isolated and in a charged condition.

Immediately thereafter, device 22 becomes conducting for the duration of pulse c and its anode drops in potential. This renders the cathode of diode 100 negative with respect to its anode and establishes a discharge path for condenser 28, which extends from ground through diode 100, condenser 28, and device 22 back to ground. Condenser 28, which was previously charged to 390 volts, now discharges to an extent dependent upon the extent to which discharge device 22 is conducting during pulse c, and hence to an extent dependent upon the intensity of the pulse received from the remote point during pulse c.

At termination of pulse c, device 22 again becomes non-conducting, its anode potential thus rises and the cathode of diode 100 becomes positive with respect to its anode and that diode again becomes non-conducting. Condensers 27 and 28 now exist with their new charges in a circuit which extends from the 400 volt source through resistance 98, condenser 28, resistances 101 and 95, condenser 27, back to the ten volt terminal of the 400 volt source. The two condensers are charged in opposite directions in this circuit and the total charge redistributes itself between the two condensers, with the result that resistances 95 and 101, connected between them arrive at a potential different from the original +10 volts. The change in potential on these resistors is numerically one-half of the difference of the changes in potentials on the two condensers 27 and 28 produced by the actions of devices 21 and 22 during the intervals of pulse b and pulse c. The change in potential on resistances 95 and 101 is with respect to ground and is supplied through resistance 105 and conductor 106 to the input of direct current amplifier 6' where it is amplified and supplied over conductor 107 to the screen grid 59 of discharge device 41 where it operates to control the duration of pulse a.

Let us suppose, for example, that during pulse b a weak signal is supplied from the receiver 4 to the grid 102 of device 21 so that when this device becomes conducting and its anode potential reduces, a large charge, for example, 200 volts, is placed on the previously discharged condenser 27. Also let us suppose that during pulse c, a larger signal is supplied to the grid of device 22 with the result that when this device becomes conducting and its anode potential drops, condenser 28, which previously was charged to 390 volts, we will say, discharges to 190.8 volts and has that charge on it on termination of pulse c. These two condensers are in opposed relation in the circuit extending from the +400 volt terminal through resistances 98, 101 and 95 to the +10 volt terminal and the difference in their voltages is 9.2 volts. This means that 399.2 volts (390+9.2=399.2) must distribute itself equally between the two condensers with proper polarities which, in turn, means that 199.6 volts are added to the 190.8 volts on condenser 28 to charge that condenser to a voltage of 390.4 volts and similarly 199.6 volts are subtracted from the 200 volts charge on condenser 27 to leave that condenser charged at a voltage of .4 volt. The result is that resistances 95 and 101, at the termination of pulse c, are at a positive voltage of 9.6 volts with respect to ground at the termination of pulse c.

This voltage is transmitted over conductor 106 and through amplifier 6 to the screen grid of device 41 in equipment A where it appears as a corresponding high screen grid voltage. This tends to lengthen the duration of pulse a.

Now, let us suppose the opposite condition in which a larger signal is received during pulse b and a smaller signal is received during pulse c. Discharge device 21 becomes conducting to a less extent and a smaller charge as, for example, 199.2 volts appears upon condenser 27. Device 22 becomes more highly conducting and its anode voltage is correspondingly reduced, thereby causing its condenser 28 to be discharged to the lower value as, for example, 190 volts. The difference in these two voltages is 9.2 volts which means again that 399.2 volts (390+9.2=399.2) must distribute itself equally across the two condensers 27 and 28 with proper polarities. Thus 199.6 volts are added to the 190 volt charge of condenser 28 charging that condenser to 389.6 volts and 199.6 volts are subtracted from the charge on condenser 27 which means that the polarity of the charge is reversed and a charge of .4 volt exists on that condenser with the lower electrode positive. The voltage on resistances 95 and 101, with respect to ground is then 10.4 volts positive with respect to ground.

The change in voltage is likewise amplified by direct current amplifier 6 and produces a correspondingly smaller voltage on the screen grid 59 of device 41 in equipment A thereby rendering that device less highly conductive and shortening the duration of pulse $a$.

In this way the duration of pulse $a$ is automatically lengthened and shortened to such an extent as to maintain the integrated intensity of the received impulses over the periods of pulses $b$ and $c$ equal, i.e., to maintain the area under curve 33 of FIG. 2 during pulse $b$ equal to that during pulse $c$.

It will be observed that in each case above, the change in voltage with respect to ground on resistances 95 and 101 produced during pulses $b$ and $c$ is equal to half of the difference in the change in voltage on the two condensers 27 and 28.

Condenser 110 is connected across the two resistances 105 and 94 to smooth out the variation in voltages produced on conductor 106 by the changes in voltages on the two condensers 27 and 28.

It will, of course, be understood that the impulses transmitted by the equipment 1 are transmitted at an extremely rapid rate, and that the intervals involved are extremely short, and that in circuit 98, 28, 101, 95, 27 the redistribution of charges on condensers 27 and 28, above referred to, goes on over the greater portion of the time. Current thus flows in resistances 95, 101 and 98 almost continuously. Assuming that condensers 27 and 28 are of equal size, and that resistance 95 is equal to the sum of resistances 101 and 98, no voltage is produced across resistance 94, or conductor 106, caused by redistribution of charges on condensers 27 and 28. Any inequality in these elements, such as those likely to be present by reason of manufacturing variations are prevented from effecting the indications produced by the adjustments made in balancing the devices 21 and 22 against each other. These adjustments will be later described herein.

It will, of course, be understood that any changes in charges on condensers 27 and 28 produced by action of devices 21 and 22 are with respect to previously existing charges. Furthermore, the differences in the signals applied to the control electrodes of devices 21 and 22 during pulses $b$ and $c$ are ordinarily small so that the voltage on conductor 106 is a substantially smooth continuous direct current voltage which varies with the distance from which the impulses are received.

It is important, in the operation of the system, that the devices 21 and 22 be as nearly alike as possible and that this be true over all parts of the operating characteristics of the devices. It is also important that a proper relationship between the magnitude of the pulses $b$ and $c$ supplied to the screen grids of the respective devices 21 and 22 be maintained since the conductivity of those devices is controlled by the potential applied to the screen grids as well as that applied to the control grids.

To aid in maintaining the proper relationship between the magnitudes of the pulses $b$ and $c$, the diodes 71 and 89 are employed and connected as previously described. These devices are non-conducting when the voltage of the pulse supplied by interruption of current in inductances 62, and 78, respectively is less than the voltage on the lower portion of the respective potentiometers 72 and 91, but when the voltage of the pulse supplied by interruption of current in the reactor 62, or 78, exceeds the potential on the lower portion of the respective potentiometer then the respective diode 71, or 89, becomes conducting and prevents the voltage from increasing on the screen grids 23 and 24. Thus the magnitude of the pulse supplied to the screen grid 23 is definitely limited to the voltage of the point at which the connection 163 is made to the potentiometer 72. Similarly, the voltage on the screen grid 24 is definitely limited to the voltage supplied to the cathode of diode 89 and which is determined by the position of variable contact 90 upon potentiometer 91. This latter contact 90 is made variable along potentiometer 91 for a purpose presently to be indicated.

Thus the voltage pulses supplied by inductances 62 and 78, which would otherwise be of sine wave form, are rendered of substantially square wave form by the limiting action of the diodes 71 and 89 respectively and the magnitude of these pulses is limited to definite values determined by the connections 163 and 90.

Means are also provided for initial adjustment of devices 21 and 22 to operate in balanced relationship over the operating range of their characteristics. This means comprises the switch 47, which may be employed to interrupt the input connection from signal conductor 45 to the control electrodes of the two discharge devices and which, in its upper position, supplies to the grid of these two devices a variable negative bias voltage from the variable contact 176 of potentiometer 177. The negative terminal of potentiometer 177 is connected to a highly negative terminal of the source, as for example, 90 volts as indicated by the terminal −90 and its positive terminal is connected to the two cathodes of devices 21 and 22. This switch is mechanically connected, as indicated by the dotted line 178, to a switch 179 which is opened when switch 47 is in its upper position. A meter 180 is also provided between conductors 107 and ground to indicate the voltage on that conductor.

In initially adjusting the apparatus, switch 47 is thrown to its upper position and contact 176 moved upward until the negative bias supplied to the control electrodes of devices 21 and 22 is so great that those devices are nonconducting. The reading of meter 180 is then observed. Contact 176 is then moved downward until devices 21 and 22 become conducting or until some change in the reading of meter 180 is observed. Then contact 90a is adjusted, thereby varying the magnitude of pulse $c$ on the screen grid 24, until meter 180 reads the former value, that is, the value obtaining when the discharge devices are non-conductive. Contact 176 is then moved to the lower end of the potentiometer and if the reading on meter 180 changes, condenser 84 is adjusted thereby varying the duration of pulse $c$ until the former reading of the meter 180 is again obtained. Contact 176 is then moved back to its former position where variation of the reading of meter 180 was first observed and contact 90a again adjusted until the meter 180 reads the previous value. These adjustments may be repeated until the reading of the meter 180 remains constant irrespective of the adjustment of the contact 176. Conditions are then such that the devices 21 and 22 operate in balanced relation throughout the entire length of their operating characteristics.

It will be observed that the adjustment of condenser 84 changes the duration of pulse $c$ with respect to pulse $b$ and that in the device as operated, the duration of these two pulses may not be strictly equal. In fact, these impulses will be unequal if there is any inequality in the discharge devices 21 and 22 or if resistance 95 be different from the sum of resistances 98 and 101. This, however, is not important so long as a balance between the operation of the two devices accurately obtains.

It will be observed that devices 21 and 22 are connected to operate without bias potential, the cathodes being connected directly to ground and the control electrodes being connected to ground through switch 47 and resistance 96. Thus, these devices during pulses b and c respectively pass full anode current in the absence of a received signal. Receiver 4 is so connected and arranged that signal therefrom applied to the control electrodes of devices 21 and 22 reduces the anode currents in these devices. In this way several desired results are secured. Small signals vary the grid potentials of devices 21 and 22 over a portion of the range of the operating characteristics of the tubes where the transconductance of the tubes is greatest. Large signals may drive the grids sufficiently negative to render the anode currents zero. This is advantageous since undesired large signals such as those from a monument can have no greater effect than a desired large signal. An additional advantage in the absence of grid current caused by large signals and the undesired resulting change in bias upon the tubes, is also secured, as well as advantages which I will later point out in connection with acceleration control.

*Distance Indication Equipment*

Since the duration of pulse a varies directly with the distance from which the reflected impulses are received, it may be utilized directly as an indication of that distance and, accordingly, equipment A incorporates equipment for indicating distance to the remote reflecting surface. To this end, resistances 114 and 117 are provided connected in series across the 400 volt source. The voltage on resistance 117 is closely regulated by means of a voltage regulating vacuum tube 118', which may, for example, maintain a voltage of 150 volts between its electrodes irrespective of the current which flows therein. Meter 111, which may be calibrated in terms of distance, is connected between the point between the resistances 114 and 117 and the conductor 58 over which pulse a is supplied to equipment B through a resistance 13 and a diode 112.

During pulse a when device 42 is non-conducting, conductor 58 rises to the full voltage of the source, or 400 volts. Diode 112 is then conducting and passes current through the meter 111. On termination of pulse a when device 42 becomes conducting the conductor 58 drops in voltage to some lower value below the voltage on resistance 114 so that the diode 112 is non-conducting. Thus the current in the meter 111 varies between a fixed value determined by the 400 volt voltage of the source and zero when device 12 is non-conducting and the average value of the current therein varies directly as the duration of the pulse a. This meter thus affords an indication of distance dependent entirely upon the duration of pulse a, i.e., upon the portion of time in which device 42 is conducting, and it is not affected by any changes in the characteristics of that device, such as might occur with age, for example.

It may be, however, that a more accurate indication of distance than is secured from a current responsive indicating meter of the type indicated at 111 is desired. This may be secured by means of the balance which I shall now describe.

Directly across the voltage regulating glow tube 118' is the potentiometer 180' having a variable contact 181 which may be connected through a current indicating meter 182 and resistance 183 to the left hand terminal of resistance 113. Contact 181 may then be adjusted to such a point on potentiometer 180' that no current flows in the meter 182. The position of the contact 181 is then an accurate indication of distance to the remote reflecting surface.

If desired the contact 181 may be automatically adjusted to such a position that no current flows in the meter 182. This may be effected by a suitable control mechanism 184 connected in series with the meter 182 and which operates in response to the magnitude and polarity of the current flowing in this circuit to drive the contact 181 in the proper direction and to such an extent as to maintain zero current in the instrument 182. The mechanical drive connection between the equipment 184 and the movable contact 181 is indicated at 185. Equipment 184 may be of any suitable conventional type of which many are well known and requires no description here. Distance may then be read from a calibration on potentiometer 180'.

Resistance 183 cooperates with condenser 186 to act as a filter to smooth out the voltage pulses which appear across resistance 113 thereby to produce a steady current through the instrument 182 whenever the apparatus is not adjusted for balance.

The voltage across condenser 186 may also be supplied through terminals 187 to any other equipment such as a gun director, which it is desired to control by the equipment here described.

It may be that during the use of the equipment the characteristics of the diode 112 may vary thus effecting the indications produced. To ascertain the presence of such errors the discharge device 115 is provided having its cathode connected to an intermediate point on resistance 117 and its grid connected through a switch 118 to either of two points on a resistance 188 in parallel with resistance 117. In its anode is connected an indicating instrument 116. Switch 118 is unicontrolled with the switch 53 which in its lower position interrupts the screen grid circuit of device 42 and connects the screen grid 52 of that device to ground to render device 42 non-conducting.

When switch 53 is in either of its two upper positions, equipment A is adjusted for normal operation and a definite reading appears upon meter 116 determined by the point on resistance 188 to which switch 118 is connected. These points are so chosen that the indicating instrument 116 reads at a convenient point on the scale and the voltages of these points are different to an extent dependent upon the accuracy of the indication required. For example, the voltage between the two terminals 190 and 191 may be one-tenth of one percent of the total voltage across resistance 188.

Switch 118 may now be thrown to its lower position in which it supplies the voltage of resistance 113 to the control electrode of device 115. Switch 53 now connects the screen grid of device 42 to the cathode thereof, rendering this device non-conducting. The reading of meter 116 may be observed and it may be varied by movement of contact 192 on resistance 49. Preferably this contact is adjusted to such a position that the reading of meter 116 is midway between the two readings obtained when switch 118 is in its upper two positions.

This adjustment provides a reference by which the action of the diode 112 may be gauged. Changed in the characteristics of device 112 may be ascertained at any later time by throwing the switch 118 first to one and the other of its upper two positions to observe the reading of meter 116 and by then throwing it to its lower position to ascertain whether it then reads at a point midway between the two former readings. If its reading exceeds either of the two former readings, the error is greater than the required one-tenth of one percent and adjustment is required. It has been found that in this way the indications of the device may be maintained within an accuracy of one-tenth of one percent.

*Identification Equipment*

As previously explained it is desirable that means be provided whereby the indication produced on the viewing screen of the cathode ray oscillograph by the impulses utilized to produce the indication on meter 111, be identified on said cathode ray oscillograph so that it may be more readily followed as it moves across the screen among other indications and effects produced on the screen. This identification of the selected indication is brought about by operation of discharge device 150.

The anode of this discharge device is connected through a resistance 151 to a terminal 152, which may be a terminal of a source of any desired voltage and its cathode is connected to ground through the cathode bias resistor 153 of high value and condenser 154. Its control grid is connected to ground through resistance 155 and through a condenser 156 to the grid 24 of discharge device 22, this resistance and condenser being proportioned to have a short time constant. Upon initiation of pulse c, when the grid 24 of discharge device 22 becomes positive by reason of the pulse produced by interruption of current in inductance 78, a pulse of short duration, because of the short time constant of capacity 156 and resistance 155, is supplied to the control grid of discharge device 150 driving it positive. Current then flows in this device producing a drop of potential on resistance 153 sufficient to render the device 150 again non-conducting. The time constant of resistance 153 and condenser 154 is sufficiently long to maintain device 150 non-conducting until initiation of the next pulse c.

The potential on resistance 151 at the beginning of pulse c lowers the potential of the electrode of the pair 7 of the cathode ray oscillograph connected to resistance 151. If it be assumed that the pulse received in receiver 4 increases the potential of the upper electrode in the pair 7, it will be seen that these two variations aid each other and that a wider deflection of the beam is produced. This produces a marked identification of the particular indication on the screen, which is being selected by the equipment of FIG. 6. As actually operated it appears as a bright spot directly at the top of the particular deflection noted, whereby that deflection stands out clearly, and its movements are readily observable among the less distinct effects on the screen.

This spot follows the movements on the screen of the indication produced by the selected impulses from one side of the screen to the other as the distance being measured varies. It gives the impression of being attached to that indication.

The spot was extremely helpful in following the movements of a remote object, such as an aircraft, even at times when the echo received therefrom was so weak that the indication produced thereby on the viewing screen was substantially masked or obliterated by flicker and other undesired effects produced on the screen by noise and extraneous electrical influences. The identification pulses produced clear visual indications on the screen which followed the movements of the observed aircraft. With the equipment located at Sandy Hook the movements of an aircraft flying from New Haven to New York was readily observed over the whole distance and at times when the deflection produced by the echo directly was scarcely visible among the noise effects. The identification pulse was clearly visible througouht the test and remained accurately in synchronism with the desired echo indication even when the craft passed other craft in its course.

It may so happen, however, as previously stated, that the distance to the reflecting surface becomes such that the pulses b and c occur at the same time when stronger impulses are received from a different surface, such as a monument. The changes in the charges on condensers 27 and 28 are then affected not only by the desired impulses, but also by the stronger received pulses from the monument. The stronger pulses take control of the equipment including the identification apparatus 150 and thus the identification mark mounts the indication produced by the stronger impulses on the viewing screen of the oscillograph and remains there. This is the condition represented in FIG. 4 of the drawing where the identification mark 17 appears at the top of indication 15, having left indication 13.

It is desirable, therefore, to provide means whereby the identification may be restored to the proper indicating deflection. This means comprises switch 160 and potentiometer 161. The potentiometer is connected between ground and the 20 volt terminal of the source. Switch 160 has three positions, its movable contact being connected to conductor 106, its left hand stationary contact being connected to the variable point on the potentiometer 161, its intermediate stationary contact being connected to that point through a resistance 162, and its right hand position being open circuited altogether. The switch normaly occupies the latter position.

If it be found that when deflection 13 moves from the position which it occupies in FIG. 3 to that which it occupies in FIG. 4, its identification mark 17 leaves it to mount the higher, more extreme deflection 15, as shown in FIG. 4, the switch 160 is thrown to its left hand position so that the voltage of the conductor 106 is controlled by the potentiometer 161. The operator may then vary this potentiometer 161 to control the duration of pulse a manually. He may thus manually move the indication 17 over to the right side of the screen or to the new position of deflection 13, as shown in FIG. 5. This I call the manual positon of the switch because it affords manual control of the identification mark.

The operator then puts the switch 160 in its intermediate, or semi-automatic, position in which potential of conductor 106 is still affected by the setting of the potentiometer but is also varied to some extent by the received reflected impulses. In this position of the switch the movements of the identification mark become synchronized with the movement of that indication. He may then throw the switch 160 back to the fully automatic, or right hand, position on the drawing in which the voltage on conductor 106 is fully controlled by the charges on the two condensers 27 and 28 and the identification is rigidly synchronized with the desired indication deflection.

In actual practice it has been found that the intermediate, or semi-automatic, position of the switch 160 may be omitted, the switch being thrown directly from its manual to its automatic position.

FIG. 7 shows a modification of my invention in which the ten and twenty volt terminals of the source as indicated in FIG. 6 are omitted, the bias for the diodes 93 and 100 being obtained automaticaly. The circuit is similar to that shown in FIG. 6 and corresponding parts bear the same reference numerals. The anodes of discharge devices 21 and 22 are connected through respective resistances 90 and 98 to the 400 volt terminal of the source. The anode of discharge device 21 is connected through the large condenser 91, diode 93 and condenser 27 to ground rather than to the ten volt terminal as shown in FIG. 6. Resistance 92 is connected between the cathode of the diode and ground, the anode of the discharge device 22 is connected through condenser 28, diode 100 and a very large condenser 190 to ground, the condenser being shunted by resistance 191. The cathodes of discharge devices 21 and 22 are conected to ground as before.

During operation of discharge device 21, a certain amount of current flows therein during pulse b, through the path extending from ground, condenser 27, diode 93, condenser 91 and discharge device 21 back to ground. This current flows unidirectionally during pulse b and since devices 93 and 21 are unilaterally conducting, it flows in the direction of conductivity of these devices. Condenser 91, however, does not transmit direct current, and accordingly the flow of current in one direction through condenser 91 must equal the flow of current in the opposite direction. Current thus flows from the 400 volt source through resistance 90, condenser 91 and resistance 92 back to the grounded terminal of the source, this current flowing during the time between pulses b. This current, however, flows in such a direction through resistance 92 that it maintains the cathode of diode 93 positive with respect to the anode thereof whereby this device is maintained non-conductive by the potential on resistance 92. There is, therefore, no necessity for the bias source provided by the 20 volt terminal as shown in FIG. 6.

In the same way, current flows during pulse c from ground through condenser 190, diode 100, condenser 28 and discharge device 22 back to ground. Current flows in the opposite direction through condenser 190 in the local circuit comprising condenser 190 and resistance 191 during times between pulse c, the latter current producing a potential on resistance 191 which maintains the anode of diode 100 negative with respect to the cathode thereof.

*Acceleration Control*

In FIG. 7, the resistance corresponding to resistance 105 of FIG. 6 is divided into two resistances 105 and 105' and a large condenser 110 of, for example, one hundred microfarads, is connected from the right hand terminal of resistance 105' to the left hand terminal of resistance 94, or to ground. Also a large condenser 192 is connected from the left hand terminal of resistance 94 to a point between resistances 105 and 105'. The point between resistances 105 and 94 is connected directly to the point between resistances 95 and 101 as was the case in FIG. 6.

As was explained in connection with FIG. 6, the potential on that part of the circuit 98, 28, 101, 95, 27 and ground, which is between condensers 28 and 27, is applied through conductor 193 and resistances 105 and 105' and conductor 106 to the amplifier of FIG. 6 whereby it controls the duration of pulse a. Since resistance 95 equals the resistance of resistors 101 and 98, this potential is not affected by current flowing in these resistors, by reason of redistribution of the charges in the condensers. The two resistances 105 and 105' with their associated condensers 192 and 110 operate to effect filtering as was described in connection with condenser 110 and resistance 105 of FIG. 6, but as arranged in FIG. 7, they serve an additional important function in the operation of the device. This function has to do with the maintenance of the identification mark 17 of FIGS. 3, 4, and 5 on the proper deflection and to prevent its leaving that deflection when the impulses, arriving from the distant deflecting surface, or aircraft, to be observed, arrive simultaneously with larger impulses from a stationary object, as a monument, for example. For reasons which will presently appear, I shall describe the action of these filters as acceleration control.

The maximum speed of aircraft such as are used for war purposes is now something of the order of 400 miles per hour and the maximum acceleration attainable with such aircraft is fixed by the limitations of the pilots who operate them. That is, at a certain acceleration or deceleration the pilot becomes blind, or as the expression is, "blanks out" and thus aircraft cannot be accelerated or decelerated at a rate greater than that at which the pilot becomes blind.

If the aircraft being observed by the equipment of my invention is approaching or leaving the equipment with a certain velocity and acceleration or deceleration, its corresponding deflection 13 of FIG. 3, for example, moves across the screen at a corresponding velocity and acceleration or deceleration. If the deflection 13 on the viewing screen bearing the identification mark 17 passes the deflection 15 produced by echoes from a monument, its identification mark 17 must decelerate at an extremely rapid rate if it becomes attached to the deflection 15 which is stationary. In accordance with my invention, the filters 105, 192 and 105', 110 are so proportioned as to prevent such rapid deceleration. In other words, they are so proportioned as to prevent such rapid change in voltage on conductor 106 that the identification pulse may be affected by impulses from the monument arriving at the same time as those from the observed aircraft even though they be of much greater intensity. The result is that the identification mark 17 follows the desired deflection 13 from the left to right of the screen through the taller deflection 15 produced by the monument.

To this end, resistance 105' and conduenser 110 may be proportioned to prevent change in voltage on conductor 106 by reason of change in voltage on conductor 193 at a rate faster than a rate corresponding to the highest velocity of aircraft. Similarly resistance 105 and condenser 192 may be proportioned to prevent any change in voltage across condenser 192 by reason of change in voltage on conductor 193 at any rate greater than a rate corresponding to the highest acceleration of aircraft. With the elements so proportioned the potential on conductor 106 cannot change sufficiently rapidly to cause the identification mark to leave the desired moving deflection to become attached to an undesired deflection produced by more intense received signals.

However, it has been found that if the time delay produced by filters 105', 110 and 105, 192 be made too great the apparatus becomes unstable in its operation. That is, the potential on conductor 106 changes so slowly that the identification pulse does not follow accurately the desired deflection but oscillates about in an undesired way. The resistors 105 and 105' and condensers 110 and 192 may, however, be so proportioned that the desired object is largely secured when the equipment is used in connection with aircraft without encountering such undesired instability. In one system which operated satisfactorily these elements had the following values although it will be understood that these values may vary widely:

Condenser 110=100 µf.
Condenser 192=1 µf.
Resistance 105'=1 megohm
Resistance 105=1 megohm The amount of time delay required in filters 105', 110 and 105, 192 for satisfactory acceleration control without the undesired instability mentioned is reduced by empolyment of as much amplification in the signal channel as it is practical to use. In this way the ratio between the effect of a large signal produced by reflection from a monument and that of a small desired signal upon the potential of conductor 103 is minimized, the small desired signal having nearly as great effect as the signal from a large monument. This effect is enhanced by the fact that the control electrodes of devices 21 and 22 are driven negative from the cathode potential by the received signal to reduce the anode current to zero, or as nearly zero as possible whereby advantage is taken of the sharp cut-off characteristics of the discharge devices.

Let us suppose, for example, that a remote aircraft is approaching from the distance under observation by the equipment of my invention. Also suppose that the potential on conductor 193 is falling with respect to ground causing corresponding decrease in potential on conductor 106 thereby to decrease the length of pulse a at the same rate at which the craft approaches. As the craft attains the same distance as that of the monument the potential on conductor 193 suddenly changes for the duration of time when the craft is at that distance. This sudden change in potential does not, however, immediately effect the conductor 106 because of the time delay action of condensers 192 and 110 with the result that the identification mark moves on across the scale about as it did before. Before sufficient time has elapsed to cause any change in the voltage on conductor 106 by reason of reflections from the monument, the craft will have passed the monument and the voltage change on conductor 193 disappeared. Thus the identification mark on the viewing screen passes the deflection 15 produced by the monument and follows the desired deflection thereafter.

While I have shown a particular embodiment of my invention, it will, of course, be understood that I do not wish to be limited thereto since many modifications both in the circuit arrangement and in the instrumentalities employed may be made without departing from the true spirit and scope of my invention and I contemplate by the appended claims to cover any such modifications as fall within the true spirit and scope of my invention.

What I claim as new and desire to secure by Letters Patent of the United States is:

1. In combination, means to transmit an impulse to a distant surface, means to receive said impulse after reflection from said distant surface, and means to maintain said last means disabled during the entire time required for travel of said impulse to said surface and thence to said receiving means and to render said receiving means operative for a short predetermined interval including the instant when reception occurs, and means responsive to the time in said interval when reception occurs to vary the length of the time over which said receiving means is disabled in accordance with the distance to said surface.

2. In a system in which impulses are transmitted in succession to a distant object, the transmission of each impulse being followed by reception in receiving means of an impulse from said object at a time dependent upon the distance to said object, the combination of means for maintaining said receiving means disabled throughout the time of travel of each of said impulses, means for rendering said receiving means effective only over short predetermined intervals occurring in succession, and means responsive to the relation between the portions of said impulse received in said successive intervals for synchronizing the successive periods of effectiveness of said receiving means with the periods when said impulses arrive at said receiving means during variations in distance to said object.

3. In a system in which impulses are transmitted in succession to a distant object, the transmission of each impulse being followed by reception of an impulse from said object in a receiving means at a time dependent upon the distance to said object, the combination of means for integrating the intensity of said impulses as received over two successive intervals, and means for maintaining said receiving means disabled for a period of time after each impulse is transmitted determined in accordance with the relation between the integrated intensities of said impulses over said two intervals.

4. In a system in wich impulses are transmitted in succession to a distant object, the transmission of each impulse being followed by reception of an impulse from said object in a receiving means at a time dependent upon the distance to said object, the combination of means for integrating the intensity of said impulses as received over two successive intervals, means for maintaining said receiving means disabled for a period of time after each impulse is transmitted determined in accordance with the relation between the integrated intensities of said impulses over said two intervals, and for thereafter rendering said receiving means effective for said two successive intervals to receive the respective impulse.

5. In combination, means to transmit impulses to a distant surface and to receive said impulses after reflection therefrom, means to maintain the receiving means disabled after each impulse is transmitted until a time approximating time for reception of the respective impulse and then to render said receiving means effective to receive said impulse, and means to control the time over which said receiving means is disabled in response to the time elapsed between transmission and reception of the last previously received impulse.

6. In combination, means to transmit impulses to a distant surface and to receive said impulses after reflection therefrom, means to maintain the receiving means disabled after each impulse is transmitted until a time approximating time for reception of the respective impulse and then to render said receiving means effective to receive said impulse for successive predetermined intervals, means to integrate the intensity of impulses received over said intervals, and means to control the time over which said receiving means is disabled in accordance with the relation between the integrated intensity of the received impulse during said successive time intervals.

7. In a system in which impulses are transmitted in succession to a distant object, the transmission of each impulse being followed by reception of an impulse from said object at a time dependent upon the distance to said object, means to maintain the receiving means disabled after each impulse is transmitted until a time approximating time for reception of the respective impulse and then to render said receiving means effective to receive said impulse for successive predetermined time intervals, means to integrate the intensity of the received impulse over said successive predetermined time intervals, and means to control the length of time over which said receiver is disabled to maintain a predetermined relation between the integrated intensity of the received impulse over said two successive time intervals.

8. In combination, means to transmit impulses, a plurality of means to receive said impulses after reflection from a distant surface, means to maintain said plurality of means inoperative for an interval after each impulse is transmitted and to render first one and then another of said plurality of means operative over successive predetermined intervals, means to integrate the response of each of said plurality of means to the received impulse over the respective predetermined interval during which it is operative, and means to control the duration of said first mentioned interval in response to the relation between the integrated responses of said plurality of means to maintain a predetermined relation between said integrated responses, and means controlled by the duration of said first interval for producing a response in accordance with the distance to said surface.

9. In combination, means to transmit impulses, a plurality of means to receive said impulses after reflection from a distant surface, means to maintain said plurality of means inoperative for an interval after each impulse is transmitted and to render first one and then another of said plurality of means operative over successive predetermined intervals, and means to vary the duration of said first interval in response to the relation between the responses of said receiving means to the received impulses.

10. In a system in which impulses are transmitted in succession, and after transmission of each impulse a corresponding impulse is received from a distant point, the combination of an impulse transmitter, an impulse receiver, and a pulse generator, means responsive to transmission of an impulse by said impulse transmitter to cause said generator to produce one pulse, means to maintain said receiver inoperative for the duration of said pulse and then to render it operative for a predetermined interval, and means responsive to the time, within said predetermined interval, when reception of said corresponding impulse occurs to control the duration of the pulse produced by said pulse generator.

11. In a system in which a series of impulses is transmitted, each impulse being followed by reception of a corresponding impulse from a distant object, the combination of two receiving means for said corresponding impulses, means operative on transmission of any of said impulses to produce a series of pulses, the first pulse being of variable duration and said first pulse being followed by two successive pulses of predetermined duration, means to render said two receiving means inoperative for the duration of the first of said pulses and to render first one, and then the other of said receiving means operative for the duration of the respective pulses of predetermined duration, and means to vary the duration of said first pulse in accordance with the relation between the portions of the received pulse which is received in said two receiving means.

12. In a system in which a train of impulses is transmitted and received after reflection from distant surfaces such as moving craft and fixed objects, a receiver for said impulses having a viewing screen upon which indications of such distant surfaces appear, each indication being in position corresponding to the distance to the respective reflecting surface whereby indications produced by moving craft move across the screen through indications produced by stationary objects, means to identify on the screen one of said indications corresponding to a desired distant object, said means being controlled by impulses producing said one indication to maintain said identification when the identified indication moves through another indication produced by received impulses of greater intensity than the impulses producing the identified indication.

13. In a system in which a train of impulses is transmitted and received after reflection from distant surfaces, a receiver for said impulses having a viewing screen upon which indications are produced of different remote surfaces producing reflections, means to identify on said screen an indication corresponding to a particular distant object, and means controlled by impulses producing the identified indication to maintain said identification during movement of the identified indication through another indication on said screen produced by received impulses of greater intensity than those producing the identified indication.

14. In a system in which a train of impulses is transmitted and received after reflection from a remote moving object, a receiver for said impulses having a viewing screen upon which indications appear moving in correspondence to the movements of respective distant objects, and means to produce on said screen an additional identification indication moving in correlation with the movements of one of said first mentioned indications and controlled by impulses producing said one indication, and means to prevent change in the rate of movement on said screen of said identification indication greater than the maximum change of rate of movement of the corresponding distant object, whereby said additional indication is prevented from shifting from one of said first mentioned indications to another.

15. In a system in which a train of impulses is transmitted and received after reflection from a remote moving object, a receiver for said impulses having a viewing screen upon which indications appear moving in correspondence to the movements of respective distant objects, and means to produce on said screen an additional identification indication moving in correlation with the movements of one of said first mentioned indications and controlled by impulses producing said one indication, and means to prevent movement on said screen of said identification indication with velocity, acceleration, or deceleration greater than the velocity, acceleration, or deceleration respectively of the object producing the identified indication.

16. In a system, in which a train of impulses is transmitted and received after reflection from distant objects and utilized to produce on a viewing screen indications moving in accordance with the movements of said distant objects, means to produce an electromotive force varying with the movements of one of said distant objects, said electromotive force being subject to variation due to more intense signals received simultaneously with the signals producing the indication corresponding to said one distant object, means to produce an identification indication on said screen to identify said indication corresponding to said one distant object, means responsive to said electromotive force to control the movements of said identification indication, and means to prevent change in rate of movement of said identification indication greater than the acceleration or deceleration of the remote object notwithstanding changes in said electromotive force caused by said more intense signals.

17. In a system, in which a train of impulses is transmitted and received after reflection from distant objects and utilized to produce on a viewing screen indications moving in accordance with the movements of said distant objects, means to produce on the screen an identification indication moving with one of said first mentioned indications to identify it, said last means responding to voltage on a circuit, means to produce an electromotive force varying with the movements of the desired remote object corresponding to said one indication, and subject to variation due to more intensive undesired impulses received simultaneously with impulses producing said one indication, and means to supply said electromotive force to said circuit, said means including delay means to retard change in voltage on said circuit sufficiently to cause said identification to move through an indication produced by said more intense impulses and in accordance with the movements of the desired object.

18. In a measuring system, a circuit, means periodically to vary the potential across said circuit from a low value subject to undesired variation to a high fixed value and after each such variation to maintain said potential at said high value for a time dependent upon the quantity to be measured, a unilateral conducting device, a current responsive device operable in accordance with the quantity to be measured connected across said circuit through said unilateral conducting device, and means to supply a fixed bias to said unilateral conducting device poled to render said device non-conducting when said potential drops below a value fixed by said bias whereby the current in said device varies between a fixed high value and zero and has an average value proportional to the quantity to be measured notwithstanding undesired variation in said low potential value.

19. In combination, a discharge device, means to render said device alternately conducting and non-conducting, said device being changed from one of said conditions to the other periodically and from said other condition to said one condition at later intervals varying in accordance with a quantity to be measured, an impedance in the anode circuit of said device whereby the potential between the anode and cathode of said device varies between a fixed high value and a lower value dependent upon the degree of conductivity of said device, a unilateral conducting device, a current responsive device connected between said anode and cathode through said unilateral conducting device poled to pass current when said potential is high and to be non-conducting when said potential is low whereby the average value of current in said current responsive device is independent of the degree of conductivity of said first mentioned discharge device.

20. In combination, a pair of electron discharge devices, each of said devices having a cathode, an anode, and a control electrode, means to supply to said control electrodes respective electromotive forces to be integrated, a circuit between each anode and the respective cathode including a corresponding condenser, means to produce in each condenser a charge dependent in value upon the electromotive force between the control electrode and cathode of the respective discharge device integrated over a predetermined interval, and voltage responsive means connected between said cathodes and the terminal of both condensers remote from the cathodes to operate in accordance with the relation between the integrals of the two electromotive forces to be integrated.

21. In combination, means to receive a signal pulse, means to integrate the intensity of said signal pulse over successive intervals of its duration, said means including means to produce respective electrical signals, each of said respective electrical signals having an intensity dependent upon the integrated intensity of said impulse over a respective one of said intervals, and utilization means responsive to the relation between said respective electrical signals.

22. In combination, means to transmit periodic pulses to a distant body, means to receive pulses from said body during the intervals between said transmitted pulses at a time dependent on the distance to said body, means to render said last means inoperative over that portion of said intervals preceding reception of a pulse from said body and to render said means operative during reception of said pulse, and means responsive to a change in the time of reception of said received pulses to vary automatically the length of time over which said receiving means is rendered inoperative prior to reception of said pulses.

23. In combination, means to transmit periodic pulses toward a distant object and to receive therefrom pulses during the intervals between said transmitted pulses and at times therein corresponding to the distance to said remote object, said receiving means including pulse responsive means, means to render said pulse responsive means operative during the period of reception of said pulses and inoperative during the remaining portion of said intervals between said transmitted pulses, and means controlled by variations in the time of reception of said pulses in said intervals to vary the time in said interval when said responsive means is rendered operative.

24. The combination, in a distance finding system, of means to transmit periodic pulses toward a body the distance to which is to be determined, said pulses being shorter than the time required for a pulse to travel the shortest distance to be determined and being spaced apart by an interval greater than the time required for a pulse to travel to the most remote body within the range of said system and return, a receiver for pulses from said body, said receiver including pulse responsive means, means to render said pulse responsive means periodically operative for a predetermined time between said transmitted pulses, and means responsive to pulses received in said receiving means from said body the distance to which may vary to control said last means to vary correspondingly the time of operation of said responsive means to agree with reception of impulses from said body during variation in distance thereto.

25. In locating equipment having means to transmit periodic pulses and for receiving echoes of said pulses from a remote surface during the intervals between said pulses, said echoes arriving at a time phase dependent upon the position of said surface, the combination of means for reducing the effect of undesired signals or noise on said receiving, said means comprising means for periodically integrating the total signal over short intervals of different time phase after each transmitted pulse, one of said intervals including the time phase of the echoes, and means utilizing the relation between the different integrals to distinguish the echoes from undesired signals or noise.

26. In locating equipment having means for transmitting pulses at a desired repetition rate and for receiving echoes of said pulses from a remote surface at a time dependent upon the position of said surface, means for producing aperture pulses for rendering the receiving means effective during short intervals, one of said intervals being adjustable to include the time of arrival of echoes from said remote surface, and means for integrating the difference between the signal received during said one interval and another of said intervals whereby undesired signals tend to cancel in the difference integral.

27. In combination, means to receive an electromotive force comprising a periodic pulse, means to integrate the intensity of said electromotive force over intervals of adjacent time phase, means for subtracting the integrals produced by said last means over said intervals so as to obtain a net effect proportional to the distribution of the pulse between said intervals, and means for shifting the time phase of said intervals so as to alter the distribution of the pulse between said intervals.

28. In a pulse echo system, means to transmit recurrent pulses, means to receive an echo of said pulses during a brief aperture of the time between said recurrent pulses, and means responsive to the time of receipt of said echo in said aperture to vary the time of occurrence of said aperture to maintain agreement between receipt of said echo and occurrence of said aperture.

29. In a pulse echo system, means to transmit recurrent pulses spaced apart by time intervals, means to receive an echo of any of said pulses during a brief aperture of said time interval, and means responsive to the time of receipt of said echo in said aperture to vary the length of time between the transmitted pulse and said aperture to maintain agreement between the receipt of said echo and occurrence of said aperture.

30. In a pulse echo system, means to transmit recurrent wave pulses spaced apart in time, means to receive echo waves of each pulse during two apertures of time occurring one after the other between said pulses, and means responsive to the relation between the waves received during said two apertures to control the time of occurrence of said apertures after said transmitted pulses.

31. In a pulse echo system, means to transmit recurrent wave pulses spaced apart in time, means to receive echo waves of each pulse during two apertures of time occurring one after the other between said pulses, means to integrate the waves received during each aperture, and means controlled by said last means to control the time of occurrence of said apertures.

32. In a pulse echo system, means to transmit recurrent wave pulses spaced apart in time, means to receive echo waves of each pulse during two apertures of time occurring one after the other between said pulses, a pair of energy storage devices, each corresponding to one of said apertures, means operative during each aperture to store energy in the respective storage device of amount dependent on the integral of waves received during the respective aperture, and means to control the time of occurrenec of said apertures in accord with the relation between said amounts of energy stored in said two storage devices.

33. In a pulse echo system, means to transmit recurrent wave pulses spaced apart in time, means to receive an echo of each pulse during two apertures of time occurring one after the other between the respective transmitted pulse and the next one of said recurrent pulses, a source of operating potential, a pair of condensers connected across said source, means operative to establish charges of opposite polarity in said condensers, each charge corresponding in magnitude to the magnitude of an echo received during a respective aperture, and utilization means responsive to the potential at a point between said condensers.

34. In combination, a source of operating potential, a pair of discharge devices, each connected across said source, a pair of condensers connected in series across said source, means to produce recurrent current pulses of variable magnitude in said devices, means responsive to said pulses in each device to establish charges of corresponding magnitude in a respective one of said condensers, the charge in one condenser being opposite to the charge in the other, and utilization means responsive to the potential existing at a point between said condensers.

35. In combination, a source of operating potential, a pair of discharge devices, each having an anode and cathode, said cathodes being connected to one terminal of said source and said anodes being connected to the opposite terminal through respective impedances, a pair of condensers connected in series across said source, each condenser corresponding to one of said devices, means to render said devices conducting during recurrent intervals, whereby the potential on each anode drops to an extent dependent on the current in the respective device, means to establish a charge in each condenser dependent upon the magnitude of said drop on the respective anode, said charges in said two condensers being of opposite polarity, and utilization means responsive to the potential between said condensers.

36. In combination, a pair of normally nonconducting electron discharge devices, each having an anode and a cathode, a source of operating potential connected between said cathode and said anode through respective resistances, means to supply periodic pulse voltages to said devices to render them conductive during successive intervals, means to control the current flowing therein in accord with signal potential occurring during said intervals, means to integrate the potential drop in each of said resistances over said intervals, an output conductor, and means to supply potential with respect to said cathodes to said conductor varying in polarity and magnitude dependent upon the relation between said integrated potentials.

37. In combination, two input terminals, each being at a potential of like polarity with respect to ground, each of said potentials being subject to variation during recurrent intervals, a unilateral conducting device connected between each of said terminals and ground and poled to be normally nonconductive and to become conductive when the potential of either terminal varies toward ground, means to integrate the current in each unilateral conducting device to produce a bias voltage across the respective unilateral conducting device of magnitude dependent on said current and poled to render the device non-conducting, an output conductor, and means to supply to said output conductor a potential of either polarity with respect to ground dependent upon the relation between said bias potentials on said two devices.

38. The combination, in a system for producing an electromotive force dependent in magnitude and polarity upon the relative magnitude of electromotive forces received over two intervals occurring in succession, of a circuit comprising a pair of condensers connected in series, means to establish a charge in each condenser dependent upon the integral of the intensity of the electromotive force received over the respective interval, and voltage responsive means connected across two points in said circuit, said points dividing said circuit into two paths each including one of said condensers, whereby the voltage supplied to said voltage responsive means has polarity and magnitude dependent upon the relation between said charges.

39. The combination, in a system for producing an electromotive force dependent in magnitude and polarity upon the relation between the integrals of currents flowing in two discharge devices over respective intervals, of two condensers connected in series in an alternating current circuit between the anode of one of said devices and the cathodes thereof, voltage responsive means connected between said cathodes and a point between said condensers dividing said circuit into two paths having equal time constants, and means to establish a charge in each of said condensers in accord with the current in the respective discharge devices integrated over the corresponding intervals, whereby voltage is supplied to said voltage responsive means having magnitude and polarity dependent upon the relation between said charges.

40. The combination, in a pulse echo system, of a bridge, means to radiate pulses to a remote object and to receive echoes thereof, a pulse generator, means to supply pulses produced by said generator through an arm of said bridge, means to vary the length of said last named pulses in accord with the distance to said object thereby to vary the effective potential across said arm, and means to maintain said bridge in balance during variations in said effective potential.

41. The combination, in a pulse echo system, of a bridge, means to transmit recurrent pulses and to receive echoes thereof from a particular remote object, means to transmit through one arm of said bridge current pulses having duration corresponding to the interval between transmission of said pulses and receipt of said echoes during variations in the distance to said remote object, whereby the balance of said bridge varies with variation in said distance, means to maintain said bridge in balance during variation of said distance, and distance indicating means controlled by said last means.

42. The combination, in a pulse echo system, of means to transmit recurrent pulses and to receive an echo thereof from a particular remote object during variations in range to said object, a bridge, means to vary the balance of said bridge in accord with variations in the time interval between each transmitted pulse and receipt of an echo thereof from said object, means to maintain said bridge in balance, and means controlled by said last means to operate in accord with the range to said object.

43. The combination, in a pulse echo system, of a bridge, means to transmit periodic pulses and to receive echoes thereof from a particular remote object, means to transmit through one arm of said bridge current pulses having duration corresponding to the interval between radiation of said pulse and receipt of said echoes during variations in the distance to said remote object, whereby the balance of said bridge varies with variation in said distance, and means to maintain said bridge in balance during variation of said distance.

44. In combination, means to transmit recurrent pulses, means to receive echoes thereof, means to produce local recurrent pulses synchronous with said transmitted pulses, means to maintain said receiving means ineffective during said local pulses and to render it effective to receive a desired echo of said transmitted pulses upon termination thereof, and means responsive to a desired echo received within a predetermined time after termination of said local pulses to control the duration of said local pulses.

45. In combination, means to transmit recurrent pulses, means to receive echoes thereof, means to produce local pulses synchronous with said transmitted pulses, means to maintain said receiving means ineffective during said local pulses and to render it effective to receive a desired echo of said transmitted pulses upon termination thereof, means responsive to a desired echo received within a predetermined time after termination of said local pulses to control the duration of said local pulses produced by said third means, and means responsive to the duration of said last mentioned pulses to indicate the range from which said echoes are received.

46. In a pulse range system, means to transmit recurrent pulses spaced apart in time, means to receive from remote bodies waves resulting from transmission of each pulse during two apertures of time occurring one after the other between said pulses, range indicating means, and means responsive to the quantum relationship between the waves received during said two apertures to control said range indicating means.

47. In a pulse echo system, means to transmit recurrent pulses spaced apart in time, means to receive echo waves of each pulse during two apertures of time occurring one after the other between said pulses, control means, means to integrate the difference in waves received in said two intervals, and means to operate said control means in accord with said integrated difference.

48. In a system in which pulses are transmitted in succession and after transmission of each pulse a corresponding pulse is received from a distant point, the combination of a pulse transmitter, a pulse receiver, a pulse generator, means to synchronize the pulses produced by said generator and transmitter, means to maintain said receiver inoperative for the duration of the pulse produced by said pulse generator and then to render it operative for a predetermined interval, and means responsive to the time in said predetermined interval when reception of said corresponding pulse occurs to control the duration of the pulse produced by said pulse generator.

49. In an object detecting system, apparatus adapted to receive pulses of radio energy comprising means for generating pulses of electromagnetic energy of desired duration, means responsive to said received pulses only during the duration of said generated pulses, means for adjusting the relative phase between said received pulses and said generated pulses, and means responsive to a predetermined phase divergence between said received pulses and said generated pulses for automatically controlling said adjusting means to maintain said received pulses and said generated pulses substantially in phase concurrence.

50. Means at an observation point for measuring a variable distance between said point and an object distant therefrom, comprising means at said point for generating and transmitting to said object a train of pulses or waves of energy spaced apart in time, means at said point for receiving the reflections or echoes of said pulses from said object, circuit control means upon which said echo pulses are impressed, means for generating pairs of auxiliary pulses at times bearing a variable known relation to the times of sending said first-mentioned pulses, means causing said pairs of auxiliary pulses to quantitatively vary the effect of said echo pulses on said circuit control means dependent upon the time relation between their impression thereon and that of said echo pulses, and means under control of said circuit control means for varying said last-mentioned time relation.

51. A radio noise-reducing system operating to eliminate noise that is displaced in time with respect to received signal pulses, comprising means for producing gate signals having substantially the same duration as said received signals, utilization means activated by said gate signals for responding to said received signals, phase shifting means for adjusting the relative time position of said gate and received signals, and means for automatically controlling said phase shifting means in response to the time position of said received signals.

52. A ground distance measuring circuit comprising a radio reflection receiver, indicator means, a moving gate generator for producing a square wave having an adjustable time duration connected for controlling said indicator means, a first range gate generator, coupling between said square wave generator and said first range gate generator for synchronizing the initiation of the pulse produced by the range gate generator with the end of the square wave produced by the moving gate generator, a second range gate generator with means for synchronizing the initiation of the pulse therein with the end of the pulse produced by the first range gate generator, a pair of coincidence devices each arranged for producing an impulse in response to coincidence of input signals therein the first of said coincidence devices having an input coupling from said first range gate generator and a second input coupling from said radio reflection receiver, the second coincidence device having an input coupling from the said second range gate generator and a second input coupling from said radio reflection receiver, means for comparing the outputs of said coincidence devices, and a feedback connection for controlling the termination of the square wave produced by said moving gate generator in response to lack of balance between the outputs of said coincidence devices, whereby the length of the output wave of said moving gate generator is adjusted for splitting the reflected received signal between said range gates.

53. An electronic target tracking circuit responsive to synchronizing pulses and video pulses reflected from said target comprising, first and second electron tubes, means for applying said video pulses simultaneously to said first and second tubes, means for generating a first gating pulse of predetermined duration, means for generating a second gating pulse also of said predetermined duration, means for applying said first gating pulse to said first tube, means for applying said second gating pulse to said second tube, and means responsive to the relative coincidence of said gating pulse and said video pulse in said first tube as compared to the relative coincidence of said gating and said video pulse in said second tube for controlling the time of occurrence of said gating pulses.

54. An electronic target tracking circuit responsive to synchronizing pulses and video pulses reflected from said target comprising, first and second electron tubes, means for applying said video pulses simultaneously to said first and second electron tubes, means for generating first and second gating pulses of predetermined equal durations in response to said synchronizing pulses, means for applying said first gating pulse to said first electron tube, means for applying said second gating pulse to said second electron tube, and means responsive to the relative coincidence of said video and gating pulses in said first and second electron tubes for controlling said means for generating said gating pulses.

55. An object locator for operation at a point above ground, comprising a radio scanner for continuously sweeping a radio beam through space in which an object or obstacle is to be located, apparatus responsive to radio energy reflected from the object having an input coupling from said scanner, means for measuring the distance to ground along said beam, and means for automatically varying the effective range of said apparatus in accordance with said measurement.

56. Apparatus for measuring distance to ground comprising means for transmitting a radio signal toward the ground and receiving a signal reflected from the ground and delayed a period of time proportional to the distance to ground, indicator means for generating a movable gate signal for controlling said indicator means, means for generating a first range gate signal synchronized with the end of the movable gate signal, means for generating a second range gate signal synchronized with the end of the first range gate signal, means for comparing the signal reflected from the ground with said range gate signals, and means responsive thereto for varying the length of the moving gate signal to cause the range gate signals to coincide to an equal extent with the signal reflected from the ground, whereby the length of the movable gate signal supplied said indicator means represents distance to ground.

57. Object locator circuits comprising a square wave generator for producing a wave having abrupt termination, a generator for producing a range gate initiated by the termination of said first-mentioned square wave, a generator for producing a second range gate initiated by the termination of said first range gate, input signal terminals, and means independently responsive to two different inputs for comparing coincidence of signals applied to said input terminals with waves supplied by said first and second range gate generators.

58. Object locator circuits comprising a signal coincidence circuit having first and second comparison signal input terminals with means for supplying thereto comparison signals displaced in time relation but substantially contiguous, a principal signal input terminal for reception of a signal to be compared in time relation with said comparison signals, a pair of electric control devices each having a pair of high-impedance input control elements, one of said control elements of each of said electric control devices being coupled to said principal signal input terminal and the remaining control elements of said electric control devices each being coupled to a different one of said comparison signal input terminals, and means for comparing the outputs of said electric control devices.

59. In combination, a pair of electron discharge devices, a pair of impedances, a source of operating potential in series with a respective one of said impedances connected between the anode and cathode of each of said devices, a pair of condensers, a pair of unilateral conducting devices, each of said condensers being connected between the anode and cathode of a respective one of said electron discharge devices through a corresponding one of said unilateral conducting devices, means to bias each unilateral conducting device to be non-conducting when the respective discharge device is non-conducting to prevent discharge of said condensers and to be conducting when the potential between the anode and cathode of the respective discharge device drops by reason of current flowing in the respective device, means to produce current in each electron discharge device of value determined by the intensity of a respective signal, and utilization means responsive to the relation between the voltages on said condensers.

60. In combination, a pair of electron discharge devices, a pair of impedances, a source of operating potential connected in series with a respective one of said impedances between the anode and cathode of each of said devices, a pair of unilateral conducting devices, a pair of condensers, each of said condensers being connected between the anode and cathode of a respective one of said electron discharge devices through a corresponding unilateral conducting device, means to bias each unilateral conducting device to be non-conducting when the respective discharge device is non-conducting and to be conducting when the potential between the anode and cathode of the respective discharge device drops by reason of current flowing in the respective device, means to produce current in each of said electron discharge devices of value determined by the intensity of a respective signal, a circuit including both of said condensers and said source, and utilization means responsive to the voltage between the cathodes of said electron discharge devices and a point on said circuit between said condensers.

61. The combination, in a pulse echo system, of means to transmit recurrent pulses and to receive an echo thereof from a particular remote object during variations in range to said object, an electrically balanced indicator, means tending to change the balance of said indicator in accordance with changes in the time interval between each transmitted pulse and receipt of an echo thereof from said object, means to overcome said tendency and to maintain said indicator in balance, and means controlled by said last means to provide an output corresponding to range to said object.

62. The combination, in a pulse echo system, of an electrically balanced circuit, means to transmit pulses to a remote object and to receive echoes thereof, a pulse generator, means to supply pulses produced by said generator to said electrical circuit, means to vary the length of said pulses in accord with the distance to said object, thereby tending to cause said circuit to depart from its balanced condition, and means to maintain said circuit in its balanced condition during variations in the length of said supplied pulses.

63. The combination, in a pulse echo system, of means to transmit recurrent pulses and to receive an echo thereof from a particular remote object during variations in range to said object, an electrically balanced controlled device, means to change the balance of said device in accordance with changes in the time interval between each transmitted pulse and receipt of an echo thereof from said object, means to return said device to balance, and means controlled by said last means to provide an output corresponding to range to said object.

64. In combination, means for recurrently transmitting pulses to remote objects, means for receiving echoes of said transmitted pulses returned from said objects, means for selecting received echoes returned from a desired object to the exclusion of received echoes returned from undesired objects despite movements in range of said object from said receiving means comprising means for controlling the time of selection of received echoes by said selecting means in response to the time of receipt of said desired echoes, and means responsive to the time of receipt of said selected received echoes for indicating the range to said desired object.

65. A noise reducing system operating to eliminate noise that is displaced in time with respect to received signal pulses comprising means for producing gate signals having substantially the same duration as said received signals, utilization means activated by said gate signals for responding to said received signals, means for adjusting the relative time position of said gate and received signals, and means for automatically controlling said adjusting means in response to the time position of said received signals.

66. Apparatus for avoiding interference due to ground reflections in an object locater comprising an indicating apparatus, means for generating a variable length gate signal for said indicating apparatus, means for generating a pair of substantially contiguous range gate signals synchronized with the end of said variable length gate signal, means for receiving a signal reflected from the ground, means for adjusting the length of the variable length gate signal to balance the timing of said range gate signals with respect to said ground signal, and means for rendering said receiving means operative to receive returned waves only for the duration of said range gate signals.

67. In combination, a source of a variable time duration gate signal, a source of at least two substantially contiguous relatively fixed duration gate signals synchronized with the end of said variable duration gate signal, means for receiving a recurrent signal, means for initially adjusting the length of the variable duration gate signal to cause the time of occurrence of said fixed duration gate signals to bracket said recurrent signal in time, and means responsive to a predetermined degree of bracketing of said recurrent signal by said fixed duration gate signals to automatically continue to adjust the duration of said variable duration gate signal to cause the time of occurrence of said fixed duration gate signals to bracket said recurrent signal in time.

68. In combination, a source of a variable time duration gate signal, a source of a plurality of substantially contiguous relatively fixed duration gate signals synchronized with the end of said variable duration gate signal, means for receiving a recurrent signal during the time of occurrence of a plurality of predetermined ones of said fixed duration signals, and means responsive to the timing of said received signal with respect to that of said predetermined fixed duration signals for adjusting the duration of said variable duration signal to cause the timing of predetermined ones of said fixed duration signals to bracket said recurrent signal in time despite a change in the timing of said recurrent signal.

69. In a pulse echo system in which recurrent pulses are transmitted and after each pulse one or more corresponding pulses are received at times dependent on the range from which the respective pulse arrives, a viewing screen, means to indicate said received pulses on said screen in space sequence corresponding to the time, sequence in which they are received, separate range indicating means, a pulse selector having an output circuit, means to supply said received pulses to said pulse selector, means to control said pulse selector to select a desired one of said received pulses and to produce a control signal responsive to said desired one of said received signal to the exclusion of other of said pulses and means responsive to said control signal to control said separate range indicating means.

70. In an object detecting system, apparatus for eliminating noise that is displaced in time with respect to radio pulse signals, a source of control signals only occurring during predetermined periodic time intervals of substantially the same duration as said radio pulse signals, means adjusting the relative time phase between said control signals and said pulse signals, and means responsive to any phase divergence between said radio pulse signals and said control signals for automatically controlling said adjusting means to maintain said radio pulse signals and said control signals substantially concurrent.

71. Means for obtaining a measure of distance between an observation point and an object distant therefrom comprising means for transmitting from said point to said object a train of energy pulses or waves spaced apart in time, circuit control means at said point, means at said point for receiving reflections or echoes of said pulses from said object and impressing them upon said circuit control means, means at said point for generating a pair of pulses within each period of time between adjacent pulses in said train produced by said transmitting means, means under control of each of said pairs of pulses for quantitatively controlling the effect of the corresponding echo pulse upon the circuit control means, and means for controlling said last-mentioned means by said circuit control means.

72. In a pulse echo system, the combination of means to transmit pulses of energy waves at a given recurrence rate to a remote object, means to receive echo pulses returned from said object and produce a first series of control pulses having said given recurrence rate, means producing a second series of control pulses of the same recurrence rate as said first series, means producing a third series of control pulses of the same recurrence rate as said first and second series of pulses and of fixed timing with respect to said second series of control pulses, a control circuit, means controlled jointly by said first and second series of control pulses for energizing said control circuit in one direction upon a shift in the timing of said received echo pulses in one direction from a predetermined timing thereof with respect to said transmitted pulses, and means controlled jointly by said first and third series of control pulses for energizing said control circuit in the opposite direction upon a shift in the timing of said received echo pulses in the opposite direction from said predetermined timing.

73. In a system in which a train of impulses is transmitted and is received after reflection from one or more distant surfaces, a receiver for said impulses having a viewing screen upon which indications of the different received impulses appear, each indication being in position corresponding to the distance to the respective reflecting surface from which impulses producing the respective indication are reflected whereby indications of two or more reflecting surfaces may appear on said screen simultaneously, means to identify on the screen a selected one of the different indications present which corresponds to a particular distant reflecting surface, the movement of which is to be more particularly observed, and to cause that selected indication to stand out more prominently by reason of said identification among the other indications on said screen and means to automatically maintain said identification of said selected one indication during movement of the reflecting surface the distance to which is thereby continuously indicated.

74. In a system in which a train of impulses is transmitted and is received after reflection from one or more distant surfaces, a receiver for said impulses having a viewing screen upon which indications of the different received impulses appear, each indication being in position corresponding to the distance to the respective reflecting surface from which impulses produced by the respective indication are reflected whereby indications of two or more reflecting surfaces may appear on said screen simultaneously, and means to time select received impulses producing one of said indications and to produce a control signal responsive to the time position of said selected impulses exclusive of the time position of said other impulses indicated on said screen which are received at time positions other than when the selected impulses are received, and means responsive to said control signal to vary the time after the transmitted pulses when said selection is made and to indicate independently of said screen the distance from which the selected impulses are received.

75. In combination, means to receive signal pulses in succession, means to integrate the intensity of each signal pulse over successive first and second intervals thereof to produce first and second electrical signals, means responsive to the difference in magnitude between said first and second electrical signals to produce a control signal.

76. In combination, means to receive signal pulses in succession, means to integrate the intensity of each signal pulse over successive first and second intervals thereof to produce first and second electrical signals, means to produce an output signal corresponding to the difference in magnitude between said first and second electrical signals, means to filter said output signal to produce smooth variations of said output signal over a succession of said pulses, and means responsive to the output of said aforementioned means to utilize the relationship between said first and second electrical signals over a succession of signal pulses.

77. In combination, means to receive signal pulses in succession, means to integrate the intensity of each signal pulse over successive first and second intervals thereof to produce first and second electrical signals, means responsive to the difference in magnitude between said first and second electrical signals to produce a control signal, means to filter said control signal to limit its maximum rate of change over a succession of signal pulses.

78. In a pulse echo system in which recurrent pulses are transmitted and after each pulse one or more corresponding pulses are received at times dependent on the range from which the respective pulse arrives, a viewing screen, means to indicate said received pulses on said screen in space sequence corresponding to the time sequence in which they are received, separate range indicating means, means to time select pulses producing one of said indications on said screen to the exclusion of other pulses producing indications on said screen, means automatically responsive to the time position of said time selected pulses to produce a control signal and means responsive to said control signal and said transmitted pulses to control said separate range indicating means.

79. In a pulse echo system, means to transmit recurrent pulses spaced apart in time, means to receive echo waves of each pulse during two apertures of time occurring one after the other between said pulses, and control means comprising means to derive a control signal that is a function of the quantum relationship between the waves received in the two apertures.

80. In a pulse echo system, means to transmit recurrent pulses spaced apart in time, means to receive echo waves of each pulse during two apertures of time occurring one after the other between said pulses, control means comprising means to derive a control signal that is a function of the quantum relationship between the waves received in the two apertures and means responsive to said control signal to vary the time of occurrence of said apertures in the interval between said transmitted recurrent pulses.

81. In a range system, means to transmit recurrent pulses and to receive corresponding pulses from distant objects after each transmitted pulse, said received pulses varying in time occurrence with respect to corresponding transmitted pulses, a cathode ray device, a range indication system, a first signal channel between said receiving means and said cathode ray device, a second signal channel between said receiving means and said range indication system, said first channel being operative to transmit all of said received pulses to said cathode ray device, means for indicating all of said received pulses on said cathode ray device in space sequence corresponding to the time sequence in which said pulses arrive, and means to render said second channel automatically responsive to the time position of only a particular one of said received pulses to transmit an electrical signal to said range indication system, said range indication system including means to indicate the range of an object from which said selected pulses are received.

82. In a range system, a range indicator, a viewing screen, means to transmit recurrent pulses and to receive corresponding pulses from distant bodies in time sequence corresponding to the range to said bodies, means to indicate said received pulses on said viewing screen in space sequence corresponding to the time sequence in which said pulses arrive, means to select pulses producing an indication at a particular point on said screen and means to supply control signals to said range indicator, said control signals being responsive to the time position of only said select pulses, said range indicator including means to indicate the distance from which said select pulses arrive whereby the relative movement of different bodies from which pulses are received may be observed on said screen and the range of a particular body may be determined from said range indicator.

References Cited in the file of this patent

UNITED STATES PATENTS

| | | |
|---|---|---|
| 1,924,156 | Hart | Aug. 29, 1933 |
| 1,924,174 | Wolf | Aug. 29, 1933 |
| 2,055,883 | Terry | Sept. 29, 1936 |
| 2,084,760 | Beverage | June 22, 1937 |
| 2,176,742 | La Pierre | Oct. 17, 1939 |
| 2,189,549 | Hershberger | Feb. 6, 1940 |
| 2,208,349 | Ulbricht | July 16, 1940 |
| 2,300,189 | Wolff | Oct. 27, 1942 |
| 2,578,256 | MacNichol | Dec. 11, 1951 |
| 2,613,317 | Mozley | Oct. 7, 1952 |

FOREIGN PATENTS

| | | |
|---|---|---|
| 474,690 | Great Britain | Nov. 5, 1937 |
| 113,233 | Australia | June 2, 1941 |

OTHER REFERENCES

Signal Corps Laboratories Report for 1937 on Means of Detecting the Approach of Aircraft and Marine Surface Craft Beyond Visual Range. June 30, 1937. Contents include pages *a*, *b* and 1 to 33 and illustrations Figures 1 to 20.

Affidavit and description relative to May 1937 Signal Corps Demonstration, comprising 8 pages and 1 large sheet drawings.